United States Patent [19]

Sasaki et al.

[11] Patent Number: 5,646,372
[45] Date of Patent: Jul. 8, 1997

[54] METAL TUBE AND ELECTRIC CABLE USING THE SAME

[75] Inventors: Takashi Sasaki; Ayumi Nishidate; Kenji Nagayama; Yoshinobu Sato, all of Ibaraki, Japan

[73] Assignee: Hitachi Cable Ltd., Tokyo, Japan

[21] Appl. No.: 415,349

[22] Filed: Apr. 3, 1995

[30] Foreign Application Priority Data

Sep. 27, 1994 [JP] Japan .................. 6-231318

[51] Int. Cl.⁶ .................................. H01B 5/10
[52] U.S. Cl. ........................ 174/126.2; 174/130
[58] Field of Search .................. 174/107, 126.1, 174/126.2, 130, 68.1, 68.3; 428/544; 138/141, 140; 29/825; 156/50

[56] References Cited

U.S. PATENT DOCUMENTS

| | | | |
|---|---|---|---|
| 3,681,515 | 8/1972 | Mildner | 174/107 |
| 3,874,076 | 4/1975 | Tsukamoto et al. | 29/624 |
| 3,949,896 | 4/1976 | Luc | 220/75 |
| 4,442,181 | 4/1984 | Saito et al. | 428/623 |
| 4,497,537 | 2/1985 | Dench | 350/96.23 |
| 4,647,720 | 3/1987 | Vokey | 174/107 |
| 4,863,060 | 9/1989 | Saunders | 220/75 |
| 5,436,058 | 7/1995 | Kato et al. | 428/194 |

FOREIGN PATENT DOCUMENTS

| | | |
|---|---|---|
| 2114594 | 10/1971 | Germany . |
| 50-24432 | 8/1975 | Japan . |

*Primary Examiner*—Kristine L. Kincaid
*Assistant Examiner*—Marc D. Machtinger
*Attorney, Agent, or Firm*—Helfgott & Karas, P.C.

[57] ABSTRACT

A metal tube is formed from a metal tape. The metal tape is rounded to be abutted at the both side edges, and the edge-abutted portion is welded to provide a butt-welded seam. The metal tube includes an inner iron base layer, a chrome layer provided on the base layer, and an outer chrome oxide layer provided on the chrome layer. The chrome oxide layer is preferably toughened at the outer surface to provide an appropriate frictional resistance relative to forming tools.

2 Claims, 5 Drawing Sheets

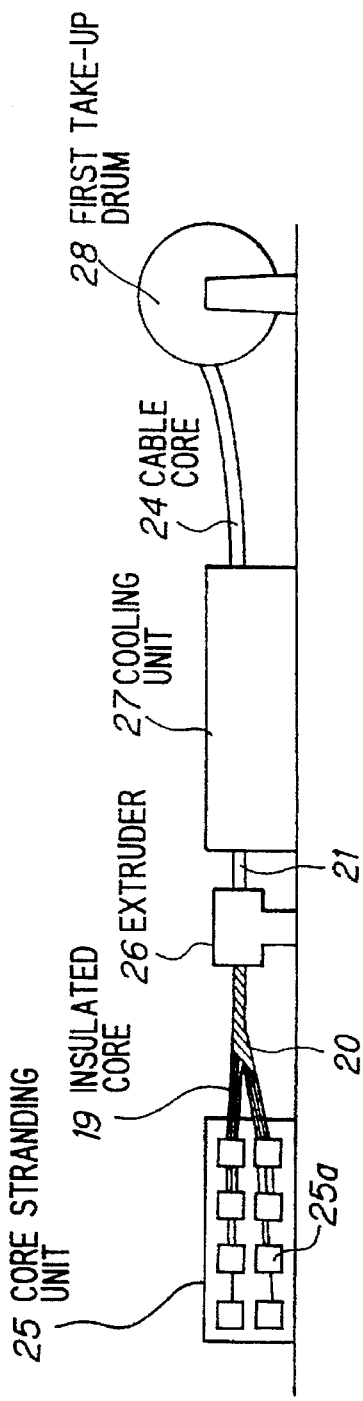
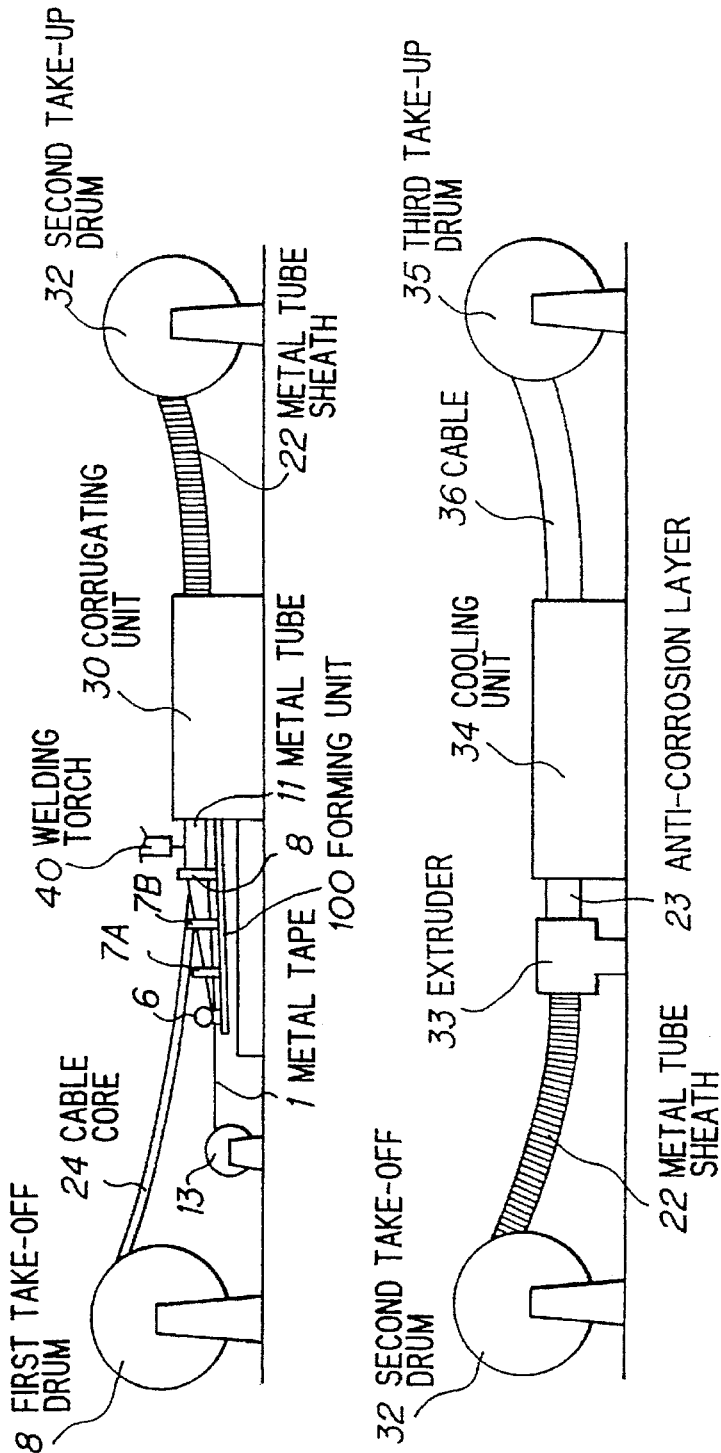
FIG. 9A
FIG. 9B
FIG. 9C

METAL TUBE AND ELECTRIC CABLE USING THE SAME

FIELD OF THE INVENTION

The invention relates to a metal tube and an electric cable using the same, and more particularly to, a metal tube formed from a metal tape having no rust-resisting oil to be removed, and an electric cable having a sheath of the metal tube.

BACKGROUND OF THE INVENTION

A conventional metal tube is formed by the steps of preparing a metal tape coated with rust-resisting oil, removing the rust-resisting oil from the metal tape with use of organic solvent or surface-active agent (surfactant), forming the metal tape to be round, and welding a butt portion of the rounded metal tape to provide a metal tube by means of a TIG welding torch.

In the process as described above, however, the rust-resisting oil will be burnt to deteriorate the quality of the metal tube, unless the rust-resisting oil is removed prior to the formation of the metal tube.

These days, the use of rinsing agent such as organic solvent, etc. has been requested to be abolished, so that the global environment will be protected from contamination.

In this circumstance, the inventors have repeated experiments, in which metal tapes having various anti-corrosion layers are prepared, to test forming properties in manufacturing metal tubes from the prepared metal tapes, and to check as to whether or not the metal tapes are damaged on the surfaces thereof due to the lack of the forming properties.

SUMMARY OF THE INVENTION

Accordingly, it is an object of the invention to provide a metal tube formed from a metal tape that does not require a rust-resisting oil which later must be removed prior to the formation of the metal tube, and an electric cable comprising a sheath of the metal tube.

It is a further object of the invention to provide a metal tube formed from a metal tape in which no damage occurs on the surface of the metal tape during the formation of the metal tube, and an electric cable comprising a sheath of the metal tube.

It is a still further object of the invention to provide a metal tube formed from a metal tape with high productivity, and an electric cable comprising a sheath of the metal tube.

It is a yet still further object of the invention to provide a metal tube formed from a metal tape in which anti-corrosion properties are improved and a long life is obtained, and an electric cable comprising a sheath of the metal tube.

According to the first feature of the invention, a metal tube, comprises:

a metal tape which is rounded to provide an edge-abutted portion, the edge-abutted portion being welded to provide a butt seam;

wherein the metal tape, comprises:

a base layer which is one metal selected from iron, copper, aluminum, and steel, the base layer being an inner layer of the metal tube;

a chrome layer provided on the base layer; add a chrome oxide layer provided on the chrome layer, the chrome oxide layer being an outer layer of the metal tube.

According to the second feature of the invention, a metal tube, comprises:

a metal tape which is rounded to provide an edge-abutted portion, the edge-abutted portion being welded to provide a butt seam;

wherein the metal tape, comprises:

a base layer which is one metal selected from iron, copper, aluminum, and steel, the base layer being an inner layer of the metal tube;

a chrome layer provided on the base layer;

a tin layer provided on the chrome layer; and a chrome oxide layer provided on the tin layer, the chrome oxide layer being an outer layer of the metal tube.

According to the third feature of the invention, an electric cable, comprises:

a cable core comprising insulated cores each comprising a conductor and an insulation;

a sheath of a metal tube for protecting the cable core; and an anti-corrosion layer provided on the sheath;

wherein the metal tube, comprises:

a metal tape which is rounded to provide an edge-abutted portion, the edge-abutted portion being welded to provide a butt seam;

wherein the metal tape, comprises:

a base layer which is one metal selected from iron, copper, aluminum, and steel, the base layer being an inner layer of the metal tube;

a chrome layer provided on the base layer; and a chrome oxide layer provided on the chrome layer, the chrome oxide layer being an outer layer of the metal tube.

According to the fourth feature of the invention, an electric cable, comprises:

a cable core comprising insulated cores each comprising a conductor and an insulation;

a sheath of a metal tube for protecting the cable core; and an anti-corrosion layer provided on the sheath;

wherein the metal tube, comprises:

a metal tape which is rounded to provide an edge-abutted portion, the edge-abutted portion being welded to provide a butt seam;

wherein the metal tape, comprises:

a base layer which is one metal selected from iron, copper, aluminum, and steel, the base layer being an inner layer of the metal tube;

a chrome layer provided on the base layer;

a tin layer provided on the chrome layer; and a chrome oxide layer provided on the tin layer, the chrome oxide layer being an outer layer of the metal tube.

BRIEF DESCRIPTION OF THE DRAWINGS

The invention will be explained in more detail in conjunction with appended drawings, wherein:

FIGS. 9A to 9C are explanatory diagrams showing an apparatus for manufacturing the electric cable which is in the first preferred embodiment.

DESCRIPTION OF THE PREFERRED EMBODIMENTS

Before explaining a metal tube and an electric cable protected by the metal tube in the preferred embodiments according to the invention, the aforementioned conventional metal tube will be explained.

Figure 1:
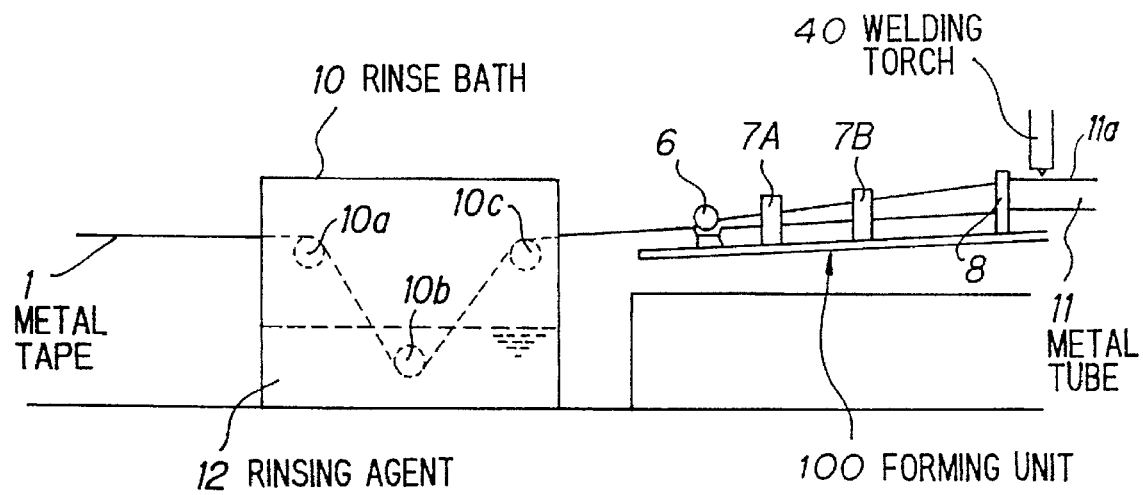
FIG. 1 is an explanatory diagram showing an apparatus for manufacturing a conventional metal tube.

FIG. 1 shows an apparatus for manufacturing the conventional metal tube. This metal tube-manufacturing apparatus comprises a rinse bath 10 having rollers 10a, 10b and 10c for supporting a metal tape 1 of iron to be supplied in the right direction in FIG. 1, and containing rinsing agent 12 such as organic solvent, surface-active agent for rinsing rust-resisting oil coated on the surface of the metal tape 1, a forming unit 100 comprising a roller 6, dies 7A and 7B, and a shaping ring 8, and a welding torch 40 for welding a butt portion 11a of a metal tube 11 formed from the metal tape 1.

In the manufacture of the metal tube 11, the metal tape 1 is supplied from a take-off drum (not shown) to the rollers 10a, 10b and 10c of the rinse bath 10, in which the rust-resisting oil is removed by the rinsing agent 12. Then, the metal tape 1 is passed through the roller 6, the dies 7A and 7B, and the shaping ring 8 to be formed as the metal tube 11 which is welded at the butt portion 11a by the welding torch 4. At this welding stage, the butt portion 11a of the metal tube 11 will be burnt to deteriorate the quality of the metal tube 11, unless the rust-resisting oil is removed.

Next, a metal tube in the first preferred embodiment according to the invention will be explained in FIGS. 2A to 2C and 3.

Figure 2A:
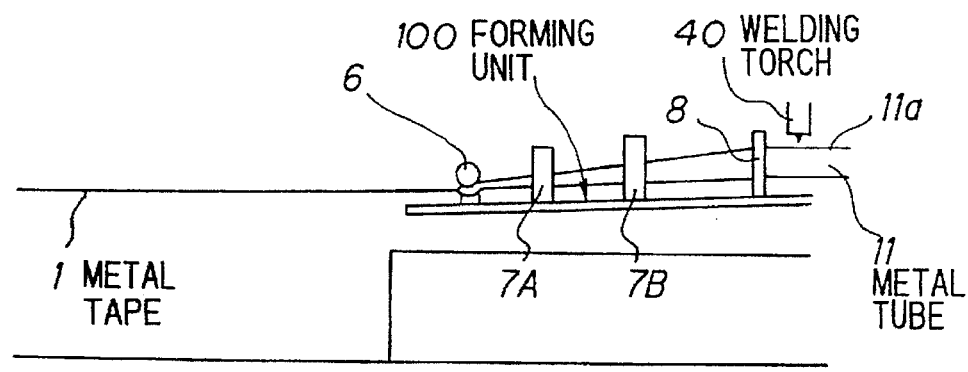
FIGS. 2A to 2C are explanatory diagrams showing an apparatus for manufacturing a metal tube which is in a first preferred embodiment according to the invention.
Figure 2B:
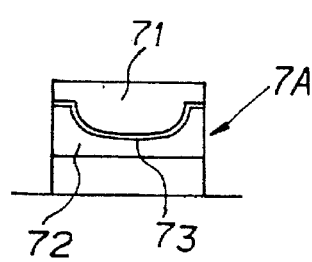
Figure 2C:
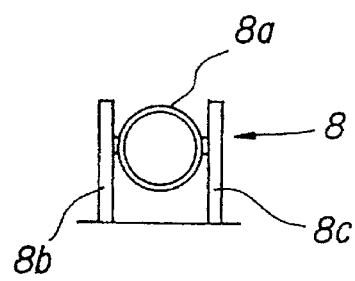

In FIGS. 2A to 2C, an apparatus for manufacturing a metal tube is shown, wherein like parts are indicated by like reference numerals as used in FIG. 1. As apparent from the illustration therein, a metal tape 1 is supplied to a forming unit 100 without passing through a rinse bath as shown in FIG. 2A. The forming unit 100 comprises a roller 100, dies 7A and 7B, and a shaping ring 8, and a TIG welding torch 40 is provided at the down-stream stage of the shaping ring 8.

FIG. 2B shows the 7A which comprises die a die aperture 73 defined by die members 71 and 72. The die 7B has the same structure as the die 7A, while a forming degree of a die aperture of the die 7B is higher than that of the die 7A.

FIG. 2C shows the shaping ring 8 which comprises a ring member 8a supported by straight members 8b and 8c.

Figure 3:
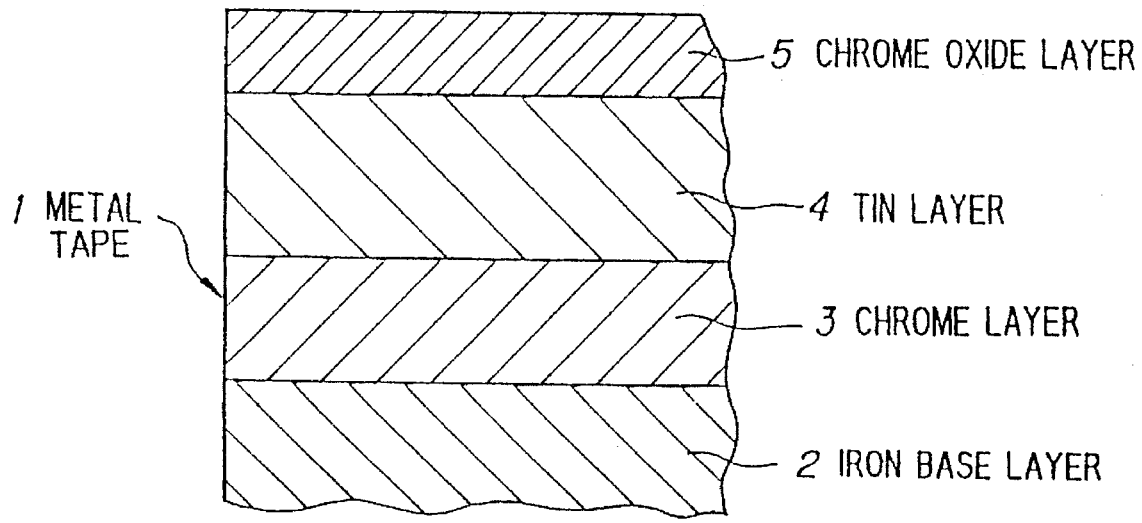
FIG. 3 is a cross-sectional view showing a metal tape to be used for the metal tube in the first preferred embodiment.

FIG. 3 shows the metal tape 1 which comprises an iron base layer 2, a chrome layer 3, a tin layer 4, and a chrome oxide layer 5.

The chrome layer 3 is to improve anti-corrosion properties and welding properties to provide good quality of welding bead. On the other hand, Zn is burnt by welding heat, and Ni is high in cost, although they provide anti-corrosion properties. A coating amount of the chrome layer 3 is preferable to in the ranged of 80 to 120 mg/m$^2$, because anti-corrosion properties are lowered at the amount of less than 80 mg/m$^2$, and welding and forming properties are lowered at the amount of more than 120 mg/m$^2$.

The tin layer 4 is to improve the welding bead state (flow of molten metal) at the time of high speed TIG weld. A coating amount of the tin layer 4 is preferable to range 160 to 200 mg/m$^2$ relative to a width of the welding bead to avoid red shortness, because the effect is not sufficient at the amount of less than 160 mg/m$^2$, and the brittleness of iron is increased at the amount of more than 200 mg/m$^2$.

The chrome oxide layer 5 is to improve tight-adherence properties relative to an anti-corrosion sheath provided on the outside of a metal tube 11 formed from the metal tape 1. A coating of the chrome oxide layer 5, which is formed of hydration oxide and provides the tight-adherence properties, is preferable in the range 8 to 14 mg/m$^2$ relative to the sheath having a thickness of 1 to 5 mm.

In the manufacture of a metal tube, the metal tape 1 as shown in FIG. 3 is supplied to the forming unit 10 in the apparatus as shown in FIG. 2A, wherein the iron base layer 2 is for a top plane, and the chrome oxide layer 5 is for a bottom plane. Then, the metal tape 1 is passed below the roller 6, and through the die aperture 73 of the die 7A, the die aperture (not shown) of the die 7B, and an inner periphery of the ring member 8a of the shaping ring 8 to be formed as the metal tube 11 which is welded at a butt portion 11a by the TIG welding torch 40.

Figure 4:
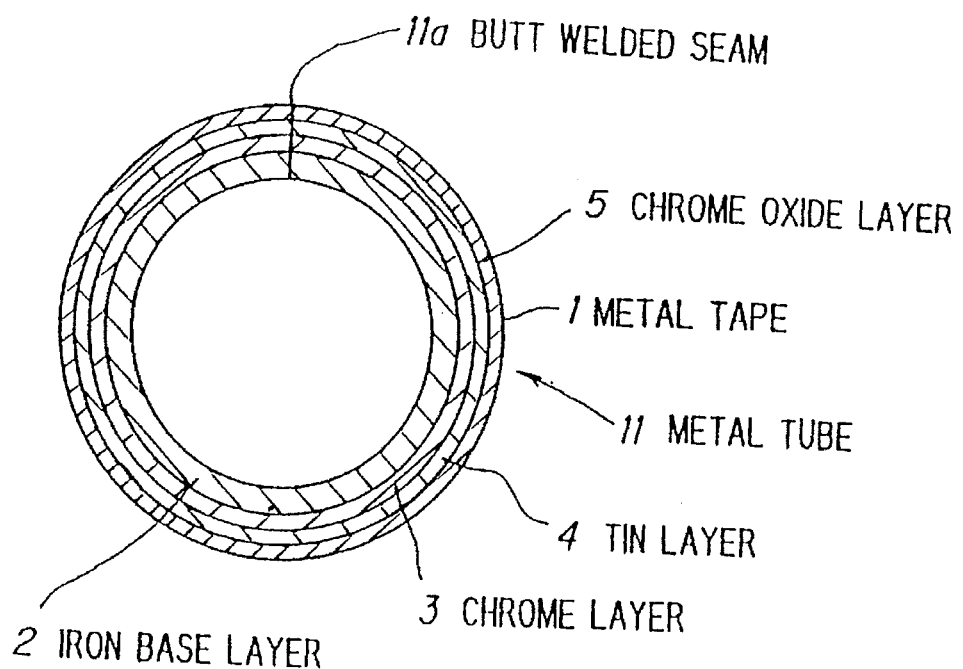
FIG. 4 is a cross-sectional view showing the metal tube in the first preferred embodiment according to the invention.

The metal tube 11 thus manufactured is shown in FIG. 4, wherein the chrome oxide layer 5 is for an outer layer of the metal tube 11, and the iron base layer 2 is for an inner layer thereof.

Figure 5:
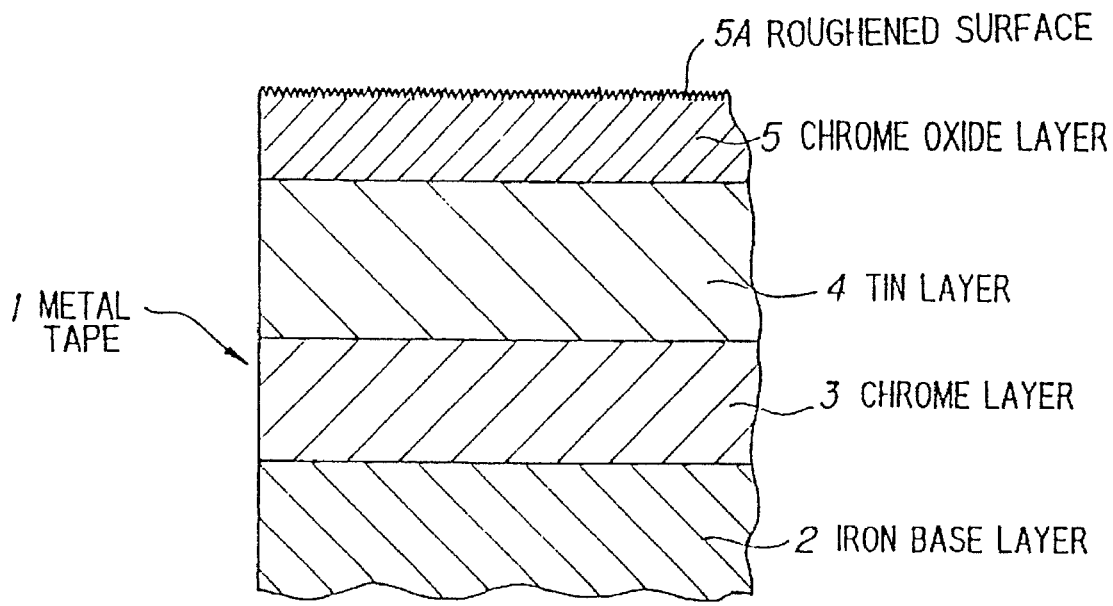
FIG. 5 is a cross-sectional view showing a metal tape to be used for a metal tube in the second preferred embodiment.

FIG. 5 shows a metal tape 1 for a metal tube in the second preferred embodiment according to the invention, wherein like parts are indicated by like reference numerals as used in FIG. 3.

In the second preferred embodiment, the chrome oxide layer 5 has a roughened surface 5A having a roughness of 0.6 to 1.5 μm. The roughened surface 5A is provided to decrease the friction resistance between the chrome oxide layer 5 of the metal tape 1 and each of forming tools such as the roller 6, the dies 7A and 7B, and the shaping ring 8 of the forming unit 10 as shown in FIG. 2A, so as to avoid damage to the metal tape 1 on the surface of the chrome oxide layer 5 in the course of the manufacture of the metal tube 11. As described above, the roughness is preferably in the range of 0.6 to 1.5 μm. The surface of the chrome oxide layer 5 tends to be damaged, if the roughness is less than 0.6 μm, approximately the roughness of a mirror surface, so that the frictional resistance of the chrome oxide layer 5 is increased relative to the forming tools. On the other hand, the forming properties are lowered, and the outer appearance of the metal tape 1, that is, the metal tube 11 becomes worse, if the roughness is more than 1.5 μm, so that the frictional resistance of the chrome oxide layer 5 is decreased relative to the forming tools.

The stiffness of the chrome oxide layer 5 is greater than those of iron and nickel which may, for example, form the forming tools, and the surface thereof is hard to slide on the forming tools. This is a further reason why the surface of the chrome oxide layer 5 is roughened, as discussed above.

The roughened surface 5A of the chrome oxide layer 5 is obtained by etching the chrome oxide layer 5, so that fine concave and convex configurations are formed thereon.

In an experiment conducted by the inventors, a metal tube 11 having a length of 1000 m is manufactured by using metal tapes 1 each having roughnesses listed Table 1, and the quality of the roughened surfaces 5A is observed.

TABLE 1

| ROUGHNESS (μm) | 0.5 | 0.6 | 0.8 | 1.0 | 1.2 | 1.4 | 1.5 | 1.6 |
|---|---|---|---|---|---|---|---|---|
| SURFACE QUALITY | B | G | E | E | E | E | G | B |

In Table 1, E is for excellent, G is for good, and B is for bad.

Figure 6:
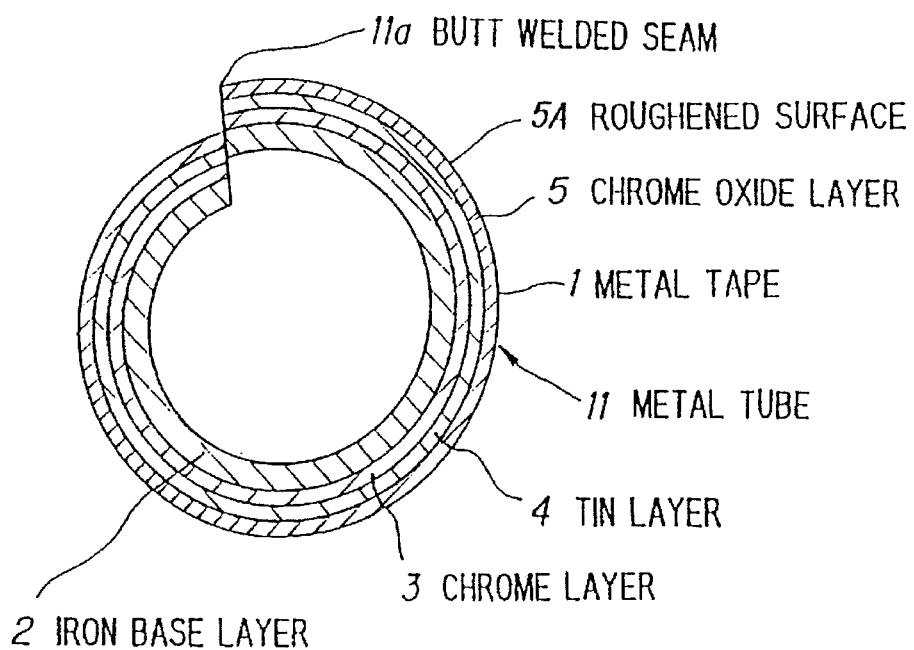
FIG. 6 is a cross-sectional view showing a metal tube formed form a metal tape having deteriorated forming properties.

The experiment has revealed that the range of the surface roughness should be 0.6 to 1.5 μm for the chrome oxide layer 5 of the metal tape 1. When the roughness of the roughened surface 5A is greater than 1.5 μm, the forming properties are deteriorated to result in a stepped portion on the butt-welded seam 11a of the metal tube 11 due to the decrease of the frictional resistance of the roughened surface 5A relative to the forming tools, as shown in FIG. 6.

Figure 7:
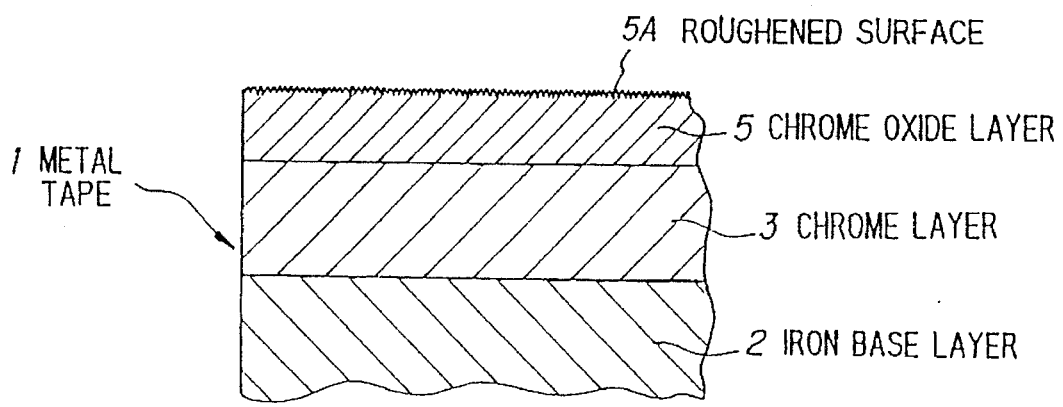
FIG. 7 is a cross-sectional view showing a metal tape to be used for a metal tube which is in a third preferred embodiment according to the invention.

FIG. 7 shows a metal tape 1 which is formed to be a metal tube 11 in the third preferred embodiment according to the invention.

In the third preferred embodiment, the metal tape 1 comprises an iron base layer 2, a chrome layer 3 having a coating amount of 80 to 140 mg/m$^2$, and a chrome oxide layre 5 having a coating amount of 8 to 20 mg/m$^2$, wherein a toughened surface 5A having a roughness of 0.6 to 1.5 μm is formed on the chrome oxide layer 5.

In this metal tape 1, the coating amounts of the chrome layer 3 and the chrome oxide layer 5 are greater than those in the first and second preferred embodiments, because it is required to increase the anti-corrosion properties of the both layers 3 and 5 in consideration of non-provision of the tin layer 4.

Next, an electric cable using a metal tape in the first preferred embodiment according to the invention will be explained, wherein the metal tape is one of the metal tapes in the first to third preferred embodiments as discussed above.

Figure 8:
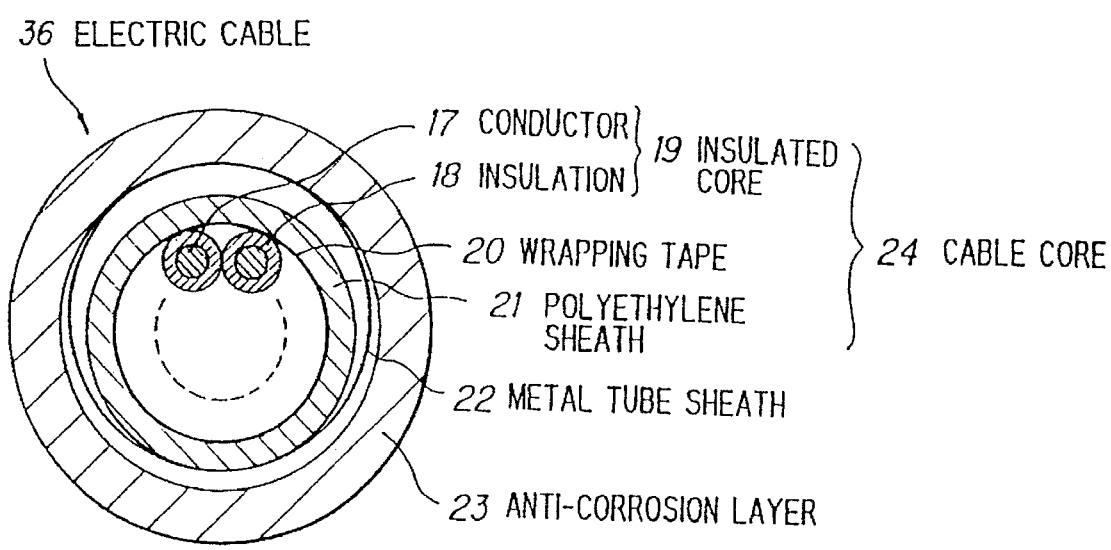
FIG. 8 is a cross-section view showing an electric cable in a first preferred embodiment according to the invention.

FIG. 8 shows electric cable 36 using the metal tube formed from the metal tape which comprises insulated cores 19 each comprising a conductor 17 and an insulation 18, a wrapping tape 20 for covering the insulated cores 19, a polyethylene sheath 21 for protecting the insulated cores 19, a metal tube sheath 22 which is formed from the metal tape to be provided on the polyethylene sheath 21, and an anti-corrosion sheath 23 of polyethylene, wherein a cable core 24 is composed of the insulated cores 19, the wrapping tape 20, and the polyethylene sheath 21, and the metal tube sheath 22 which is defined "TOUGHLEX SHEATH" (trademark of the assignee) in this industry is provided around the cable core 24.

The manufacture of the electric cable as explained above will be explained in FIGS. 9A to 9c.

In FIG. 9A, the insulated cores 19 each comprising the conductor and the insulation wound on bobbins 25a are stranded in the core standing unit 25, and the wrapping tape 20 is wrapped over the stranded insulated cores 19 by a tape wrapping unit (not shown). Then, the polyethylene sheath 21 is extruded over the stranded insulated cores 19 having the wrapping tape 20 thereon by an extruder 26, and the extruded polyethylene sheath 21 is cooled to be the cable core 24 by a cooling unit 27. Thus, the cooled cable core 24 is wound on a first take-up drum 28.

In FIG. 9B, the cable core 24 is supplied from a first take-off drum 28 which is the first take-up drum 28 to the forming unit 10 together with the metal tape 1 supplied from a take-off drum 13. The forming unit 10 comprises the roller 6, the dies 7A and 7B, and the shaping ring 8, and the TIG welding torch 40 is provided behind the shaping ring 8. The metal tape 1 is formed to be round via the forming unit 6, while the cable core 24 is guided into a circular bore of the rounded metal tape 1. Then, the metal tape 1 is welded at the butt portion to be a metal tube 11 containing the cable core 24, and the metal tube 11 is corrugated to be the metal tube sheath 22 by a corrugating unit 30. Thus, the cable core 24 protected with the corrugated metal tube sheath 22 is wound on a second take-up drum 32.

In FIG. 9C, the cable core protected with the corrugated metal tube sheath 22 is supplied from a second take-off drum 32 which is the second take-up drum 32 to an extruder 33, in which the polyethylene (or polyvinyl chloride) anti-corrosion sheath 23 is provided on the metal tube sheath 22, and the anti-corrosion sheath 23 is cooled in a cooling unit 34. Thus, the electric cable 36 is manufactured to be wound on a third take-up drum 35.

In accordance with the electric cable 36 using the metal tape 1, paint such asphalt, etc. which has been conventionally required to be applied on a metal tube sheath for rust-resist and tight-adherence is no longer necessary on the metal tube sheath 22 having the chrome oxide layer 5.

In the metal tubes 11 in the first to third preferred embodiments, and the electric cable in the first preferred embodiment, iron of the base layer 2 is replaced by copper, aluminum, and steel, and the chrome layer 3 may be provided on the base layer 2 of the metal tape by electroplating.

In accordance with the invention, advantages are obtained as explained below.

(1) No rinse operation is required in forming a metal tube from a metal tape, because the metal tape has no rust-resisting oil, but a chrome layer and a chrome oxide layer.

(2) A metal tape is not damaged by forming tools, because the metal tape has a roughened surface having a roughness of 0.6 to 0.5 μm. This means that a metal tube with high quality is obtained.

(3) An electric cable having improved anti-corrosion properties and a long life is obtained, because a sheath thereof is formed from the metal tube as discussed above.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An electric cable comprising:

a cable core including at least one conductor, each said conductor having a respective first insulation, said cable core further including a second insulation surrounding said at least one conductor having said first insulation;

a metal tube sheath encircling said cable core for protecting said cable core; and an anti-corrosion layer provided on said sheath;

said metal tube sheath being a metal tape which was rounded to provide an edge-abutted portion, said edge-abutted portion being welded to provide a butt seam, said metal tape including:

a base layer which is one metal selected from iron, copper, aluminum, and steel, said base layer being an inner layer of said metal tube sheath;

a chrome layer, provided on said base layer, having a coating amount of 80 to 140 mg/m$^2$; and a chrome oxide layer provided on said chrome layer, said chrome oxide layer being an outer layer of said metal tube sheath and having an outer surface having a roughness of 0.6 to 1.5 m, and a coating amount of 8 to 20 mg/m$^2$.

2. An electric cable comprising:

a cable core including at least one conductor, each said conductor having a respective first insulation, said cable core further including a second insulation surrounding said at least one conductor having said first insulation;

a metal tube sheath encircling said cable core for protecting said cable core; and an anti-corrosion layer provided on said sheath;

said metal tube sheath being a metal tape which was rounded to provide an edge-abutted portion, said edge-abutted portion being welded to provide a butt seam, said metal tape including:

a base layer which is one metal selected from iron, copper, aluminum, and steel, said base layer being an inner layer of said metal tube sheath;

a chrome layer, provided on said base layer, having a coating amount of 80 to 140 mg/m$^2$; and a tin layer, provided on said chrome layer, having a coating amount of 160 to 200 mg/m$^2$; and a chrome oxide layer provided on said tin layer, said chrome oxide layer being an outer layer of said metal tube sheath and having a a coating amount of 8 to 14 mg/m$^2$ and an outer surface having a roughness of 0.6 to 1.5 m.

* * * * *